Oct. 5, 1926.  1,601,797
P. HANSMANN ET AL
ANTISIDE DRAFT PLOW HITCH
Filed Nov. 12, 1920  2 Sheets-Sheet 1
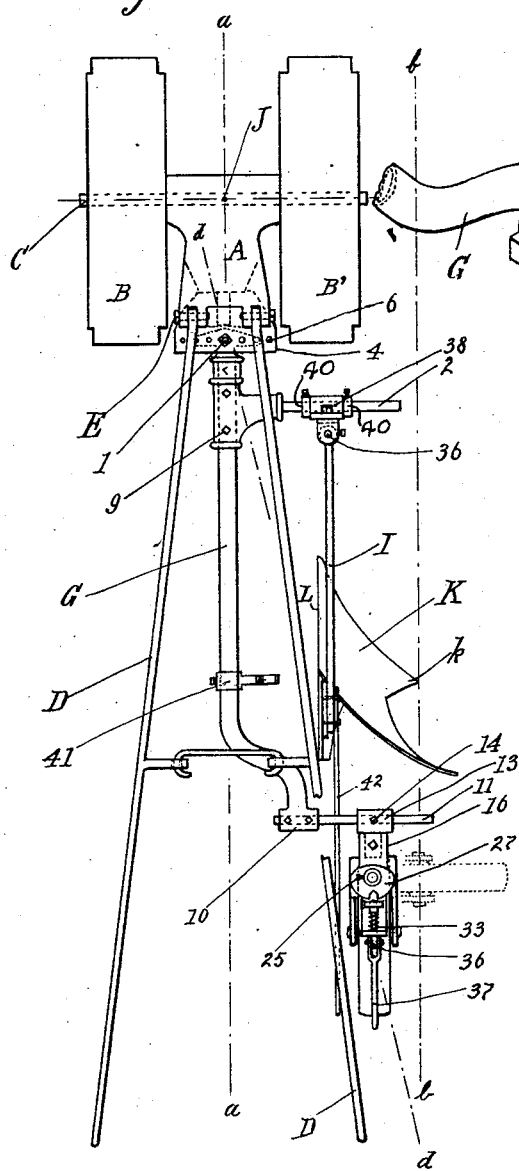
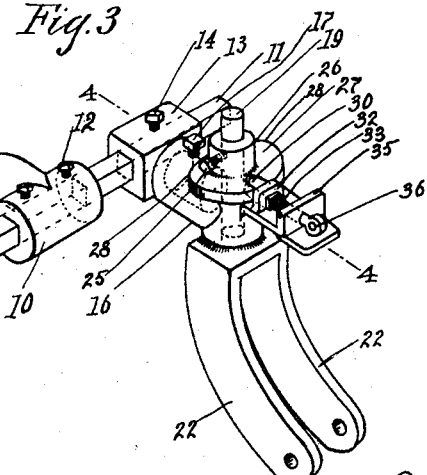
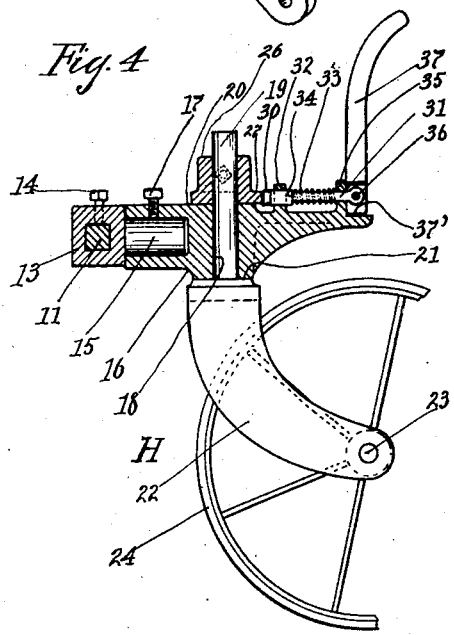
Inventors,
Paul Hansmann
Herman Strack
by
their Attorney.

Oct. 5, 1926. 1,601,797
P. HANSMANN ET AL
ANTISIDE DRAFT PLOW HITCH
Filed Nov. 12, 1920    2 Sheets-Sheet 2
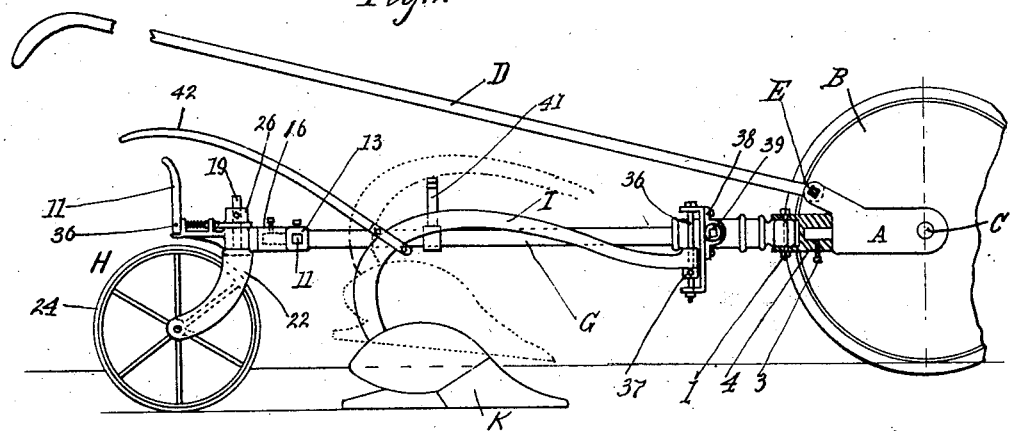
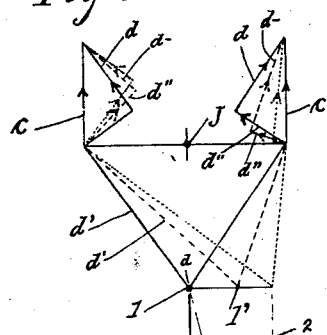
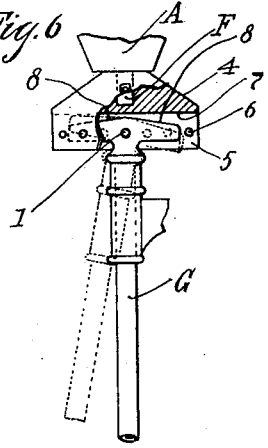
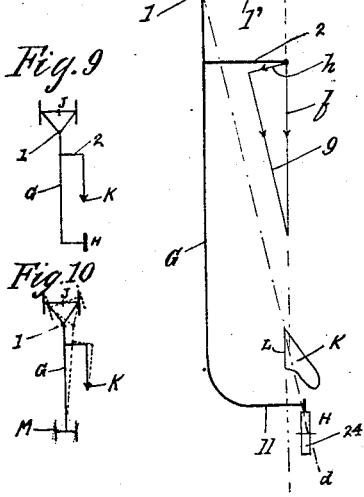
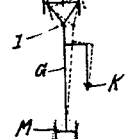
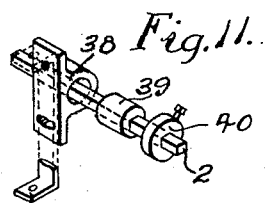
Inventors,
Paul Hansmann
Herman Strack
by A. C. Johnson
their Attorney.

Patented Oct. 5, 1926.

1,601,797

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE SAID HANSMANN.

ANTISIDE-DRAFT PLOW HITCH.

Application filed November 12, 1920. Serial No. 423,676.

This invention relates to mechanism for controlling plows hitched to tractors, and more particularly to means for counterbalancing irregularly hitched loads whereby to eliminate side draft, and thereby effectively distribute the work over both traction wheels.

One object of the invention is to provide improved counterbalancing means in connection with a widely offset plow, (relative to the center of draft of the tractor), so that it will cut the soil in the trail of one of the traction wheels, thereby enabling the tractor to travel on unplowed ground.

Many disadvantages attend the common practice of running one traction wheel in the furrow. When the tractor is tilted, both drivers ride on the edge of their respective rims instead of on the entire face thereof, thereby seriously reducing the traction capacity.

When a plow is hitched in widely offset position as above described, one traction wheel is relieved at the expense of the other, thereby setting up a tendency in the relieved wheel to circle around the overloaded one. This tendency is checked by constant, tedious operation of the steering mechanism to prevent the tractor from running into the plowed ground. Further, the excessive side draft set up at the landside of the plow, in its tendency to travel in a resultant direction toward the center of draft of the tractor, when added to the uneven apportionment of the load mentioned in the foregoing, causes the tractor to skid into the adjacent furrow. Especially is this the case with the type of tractor, represented in the accompanying drawings, which is steered by means of a handle by an operator standing on the ground.

A further object of the invention is to provide plow connecting mechanism which will remove these disadvantages, be easily handled, and readily adjustable to accommodate the varying side drafts developed by different sized plow shares.

A still further object of the invention is to provide a plow hitch of the class described, having a ground engaging element, which will function as a tractor stabilizer, as anchoring means to oppose lateral movement of the plow during travel, and as part of the steering mechanism whereby the tractor may be quickly and easily turned to change its course.

Other objects and advantages of our invention will be pointed out at opportune times throughout the specification, one form of the invention consisting in the construction, combination and arrangement of parts hereinafter described and claimed.

In the drawings—

Fig. 1 represents somewhat diagrammatically a top view of a Beeman garden tractor equipped with our invention.

Fig. 2 is a side view of same, partly in section.

Fig. 3 is a fragmentary perspective view of the combined caster and furrow wheel supporting and operating mechanism, the wheel not being shown.

Fig. 4 is section on line 4—4 of Figure 3.

Fig. 5 is a plan view of a part of the caster wheel locking mechanism.

Fig. 6 is a top view, partly in section, of the draw head of the tractor and the forward portion of the plow hitch connected therewith.

Fig. 7 is a near view of the locked caster wheel showing it set in unlocked position.

Fig. 8 is a single line diagram, representing the tractor and plow hitch, the behavior of the tractor, under several phases of offset hitching, being graphically indicated.

Figs. 9 and 10 are miniature diagrammatic views of a tractor and hitch illustrating certain disadvantages resulting from having the point of engagement with the ground at or near the center of draft of the tractor as distinguished from having it at or near the line of draft of the plow, as is the case in the present invention.

Fig. 11 is a perspective view of parts of the connection, whereby the plow beam is connected to the plow hitch, and Figure 12 is a perspective view of a fragment of the draft tongue upon which is mounted the plow support for supporting the plow when out of use.

A represents the frame, B and $B^1$ the traction wheels and C the axle and D the steering handle of a two wheel garden tractor. E designates the main pivoted connection connecting the steering handle with the frame so that the handle will swing in a vertical plane, and F is the rearwardly extending stub pin longitudinally coincident with center of draft of the tractor, which latter is located midway between the traction wheels. The power unit and its controlling devices usually operable from the handle D, are not shown.

As shown, the invention comprises a rearwardly extending skeleton structure or crooked draft tongue G, and a ground engaging supporting element H therefor, adjustably connected therewith. The draft tongue is pivotally supported by means of the pivot pin 1 on the tractor a distance to the rear of the axle C, so as to swing in a horizontal plane, and is provided with a laterally extending horizontal arm square in cross-section 2, located near and behind the right hand traction wheel B¹. Removably fitting around the stub pin F and firmly held thereon by the set screw 3, is the draw head 4, formed with two vertically spaced rearwardly extending plate members having aligned apertures 6, to receive the pin 1.

The draw head is formed with a transverse vertical flat wall 7, spaced from said apertures, said wall being engageable by the symmetrically disposed rearwardly and outwardly sloping flat faces 8, at the forward end of the tongue. When the tongue is swung upon its pivot to one side or the other of the line a—a (which latter constitutes the center of draft of the tractor) the faces 8 will engage the wall 7 to the right or left, as the case may be, to limit the movement of the tongue. This limited movement is sufficient to permit the tractor to be rotated bodily about its neutral center J, which latter is located at the intersection of the axis C with the line a—a, so that the tractor may be steered from the handle by the operator. This limited movement of the tongue permits the tractor to be steered only to the degree necessary to meet all exigencies arising when plowing in a straight or long sweeping curved course. The arm 2 may be adjusted longitudinally on the tongue by means of the set screws 9.

The rear portion of the tongue is formed with an S-shaped curve terminating in a laterally offset horizontally disposed hub 10 slidably supporting the outwardly extending squared arm 11, said arm being firmly held positioned in the hub by the set screws 12. Adjustable longitudinally on the arm 11, is the ground engaging element H. This element, (the form shown being of the rolling type) comprises a sleeve 13 slidable on the squared arm 11, and firmly held positioned by the set screw 14. Extending rearwardly from the sleeve parallel with the tongue, is the cylindrical shank 15, rotatably fitting into the housing member 16, and adapted to be adjusted circumferentially therein and held positioned thereon by the set screw 17. The housing has a vertical bore 18, wherein rotates the shank 19, the latter extending beyond the flat top 20 of the housing. The shank extends vertically from the shoulder 21 of the forked wheel support, the fork members 22 thereof being rearwardly curved and supporting a transverse spindle 23 whereon rotates the wheel 24 between said fork members. Adjustable circumferentially on the shank 19, and having set screw 25 to be thereby held positioned thereon and rotatably seated on the top 20 of the housing is the flanged collar 26, the flange 27 thereof being in part circular, said circular part terminating with inwardly curved ends 28. Midway between said curved ends the edge of the flange has an indent 29, adapted to receive the V-shaped nose 30 of the slide bolt 31. The slide bolt is squared at its nose end and is fitted so as to be slidably projected through the lug 32, and into said indent, whereby the shank 19 will be held against rotation. The round portion of the slide bolt is surrounded by an extensile coil spring 33 positioned between the shoulder 34 of the bolt and the lug 35 of the housing, the bolt passing slidably through the latter and having an eye 36 at its free end. Pivoted in said eye is the locking lever 37 having a rectangular lower cam end 37′, whereby, when the bolt is in unlocked position (Fig. 1) the flat end of the lever will engage the lug 35 to hold the bolt in withdrawn position, the stress of the spring holding the lever outstanding.

Thus, when the wheel is locked (Fig. 4), it will travel about parallel with the direction of travel of the tractor.

When unlocked, (Fig. 1), the tractor may be swung around its pivot J to any degree desired; the wheel support now having become a caster wheel, and owing to its offset wheel readily responding to the movement of the tractor by promptly assuming a steering position such as is indicated in dotted lines. By throwing the lever 37 upwardly, the wheel will automatically assume its locked position the nose of the bolt sliding on the edge of the flange 27 until it registers with the indent 29. The vertical wall of the last furrow is indicated by the line b—b. Adjustable longitudinally on the arm 2 is the plow frame I carrying the plow share K, the tip k thereof extending to the furrow line b—b. As shown (Fig. 1) the ground element H travels in the furrow cut by the plow share, while the tractor travels wholly on unplowed ground, thereby securing the benefit of the full traction capacity.

The front end of the plow frame is slidable vertically on the rod 36, having an adjustment collar 37. The rod 36 is carried on a bracket 38, by means of a yoke 38', said bracket being rotatable on a sleeve 39, which latter is slidable on the arm 2. A pair of retaining collars 40 on the arm hold the bracket positioned. On the tongue is the plow rest 41, adapted to support the plow frame when the latter is lifted by the handle 42 out of operating position indicated in dotted lines in Fig. 2.

In operation the plow is adjusted on the bar 2 so as to bring the point $k$ of the plow adjacent to the line $b-b$. The element H is now adjusted on the arm 11, to cause the wheel to run on the bed of the furrow.

The rearwardly directed force, resisting the forward movement of the tractor, tends to swing the tongue on its pivot toward the wheel B'. The wheel 24, acting as an anchor on the ground, is located a long distance to the rear of the arm 2, as compared with the distance between the center of draft of the tractor and the center of draft of the plow (which latter may be assumed to be the plane of the plow frame), said long distance being such as to effectively resist said force, whereby the landside L of the plow will be controlled to hold it in parallelism with the center of draft of the tractor. Thus, the pull of the plow on one side of the pivot is balanced by the frictional engagement with the ground of the wheel 24 on the opposite side of said pivot, the latter constituting a fulcrum for the tongue G. (The fulcrum is positioned on the tongue so as to form a long and short lever arm.) Without the use of an anchoring element the plow tends constantly to move in a resultant direction indicated approximately by the line $d-d$, thereby setting up a side friction, or what is known in the art as side draft at the landside of the plow. This side draft is of such magnitude, when the plow is hitched off center, as shown, that a tractor of a given size, can scarcely be held by one man from turning to the right into the furrow; or when held, from stalling the engine. By the use of our invention the same tractor pulled the offset plow while the operator held the handle with but one hand, which indicates that the plow resistance has been effectively balanced by the ground engaging element, and the load thereby concentrated in the pivot 1. In Figures 9 and 10 is diagrammatically shown the advantage of placing the ground element in line with the plow instead of in line with the tractor. If (Fig. 10) the plow should meet with a slight obstruction to render its gait uneven, the tractor will slightly rotate about its pivot J, owing to offset relation between the plow K and the center of ground resistance of the truck M, there being a tendency to tilt the tongue to the right. In Fig. 9, the ground resistance is directly in line with the plow, whereby the tendency to tilt the tongue is largely reduced, and a tendency established to resist the tractor pull more nearly in a straight line.

In Fig. 8 is graphically shown how the tractor, when loaded off center will constantly tend to turn upon its pivot. The length of the lines $c-c$ represent the magnitude of the pull of the respective traction wheels, and treating each of these lines as if it were the resultant of two forces we draw the line $d$ parallel with the line $d'$, and the line $d''$ at right angles thereto. Then $d$ and $d''$ are the components of the force $c$. The triangles for both forces C, it will be noted, are exactly alike because the load is concentrated at 1, $d$ representing the magnitude of that part of $c$ exerted in pushing straight ahead, and $d''$ the magnitude of that part of $c$ exerted in pushing in the direction of $d'$. Concentrating the load at 1', (taking the long dash lines) $d'$— appear greater in magnitude than $d$ (solid lined) on the right, and correspondingly smaller on the left, which shows that the magnitude of that part of C exerted in pulling straight ahead has only slightly increased on the right; but (dash lines) $d''$ on the left has more than doubled $d''$ (dash lines) on the right, as that the pull in the direction of $d'$ and $c$ on the left, will rotate the tractor about the point J. As the differential favors the relieved wheel, this will still further increase the tendency to rotate the tractor.

On the plow draft line, $f$ represents in magnitude the plow resistance force and $g$ and $h$ its components; $h$ representing the magnitude of the part of $f$ which tends to push the plow share sidewise or in other words—the side draft.

I claim—

1. In a plow of the motor-drawn type, a rigid tongue member pivoted on a vertical axis at its forward end to the draw-bar head of the tractor, a bracket rod extending laterally from a rear end portion of the tongue member, a trailer wheel supported on said bracket, a bracket rod extending laterally from a point adjacent the forward end of the tongue member, and a plow freely pivoted at the forward end of its beam to said bracket rod.

2. In a plow of the motor-drawn type, a rigid tongue member attached at its forward end to the draw-bar head of the tractor, the rearward end of the tongue being laterally off-set toward the furrow position, a trailer wheel supported by said off-set end of the tongue to travel in the freshly formed furrow, a laterally extending bracket on the tongue member adjacent the forward end thereof, and a plow attached at the forward end of its beam to the bracket to operate in alinement with one of the tractor wheels.

3. In a plow of the motor-drawn type, a rigid tongue member pivoted at its forward end to the draw-bar head of the tractor for limited lateral movement, the rearward end of the tongue being laterally off-set toward the furrow position, a bracket rod extending laterally across the furrow position, a trailer wheel adjustably supported on the rod for traveling in the furrow, a bracket rod supported by the beam adjacent the forward end thereof and extending laterally toward the furrow position, and a plow pivoted to the bracket rod to operate to the rear of one of the tractor wheels and forward of the trailer wheel.

4. In a plow of the motor-drawn type, a rigid tongue member attached at its forward end to the draw-bar head of the tractor, the rearward portion of the tongue member being laterally offset, a bracket extending laterally from said offset portion, a trailer wheel mounted on the bracket to swivel about a vertical axis, means for locking the trailer wheel against swiveling movement, a bracket extending laterally from a forward portion of the tongue member, a plow freely pivoted at the forward end of its beam to said bracket, a bracket hook carried by the tongue on which to support the beam in a raised position of the plow, and a rearwardly extending handle member carried by the plow.

5. In a plow of the motor-drawn type, a rigid tongue member attached at its forward end to the draw-bar head of the tractor, the rearward portion of the tongue member being laterally offset, a bracket extending laterally from said offset portion, a trailer wheel mounted on the bracket to swivel about a vertical axis, means for locking the trailer against swiveling movement at the will of the operator, means for adjusting the trailer wheel about a horizontal axis parallel to the longitudinal axis of the tongue member, a bracket member extending laterally from a forward portion of the tongue member, a plow universally pivoted at the forward end of its beam to said bracket, whereby said plow will operate in a position forward of the trailer wheel and to the rear of a wheel of the tractor.

In testimony whereof we affix our signatures.

PAUL HANSMANN.
HERMAN STRACK.